O. B. BJORGE.
DRAG LINE BUCKET.
APPLICATION FILED MAR. 20, 1912.
1,104,771.
Patented July 28, 1914.
2 SHEETS—SHEET 1.
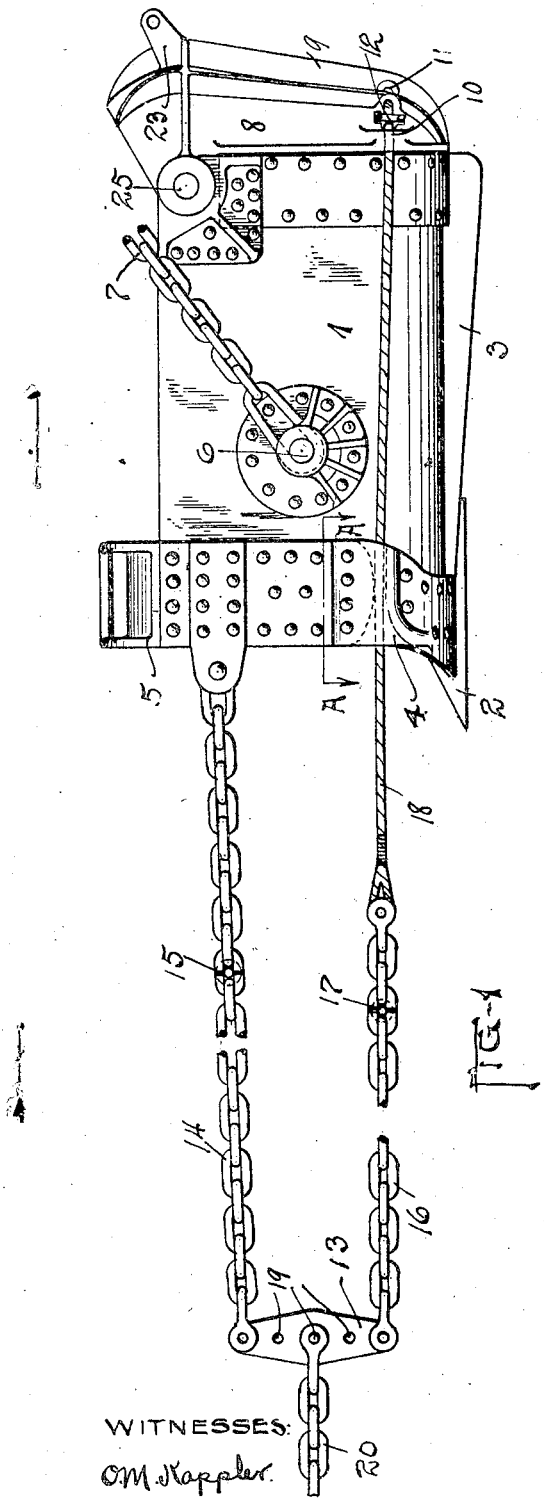
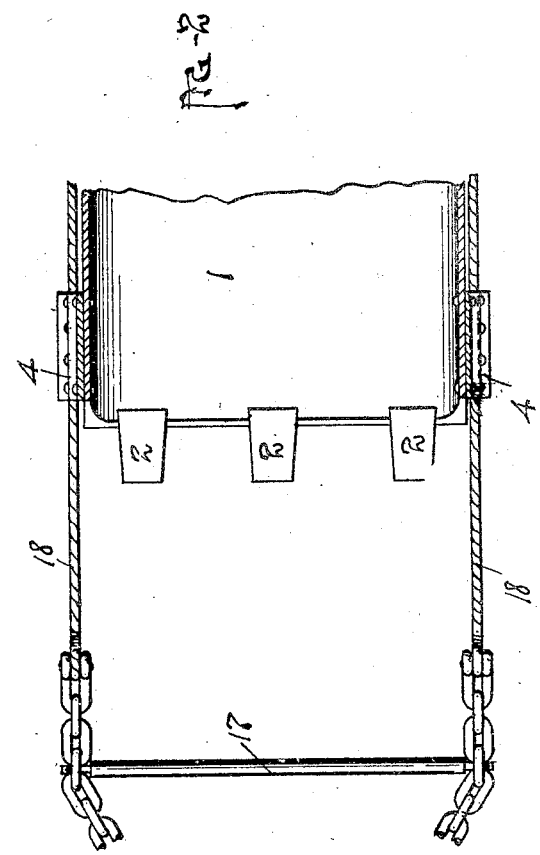
WITNESSES:
O. M. Kappler.
Robert M. Lee
INVENTOR:
Oscar B. Bjorge
BY J. B. Fay
ATTORNEY

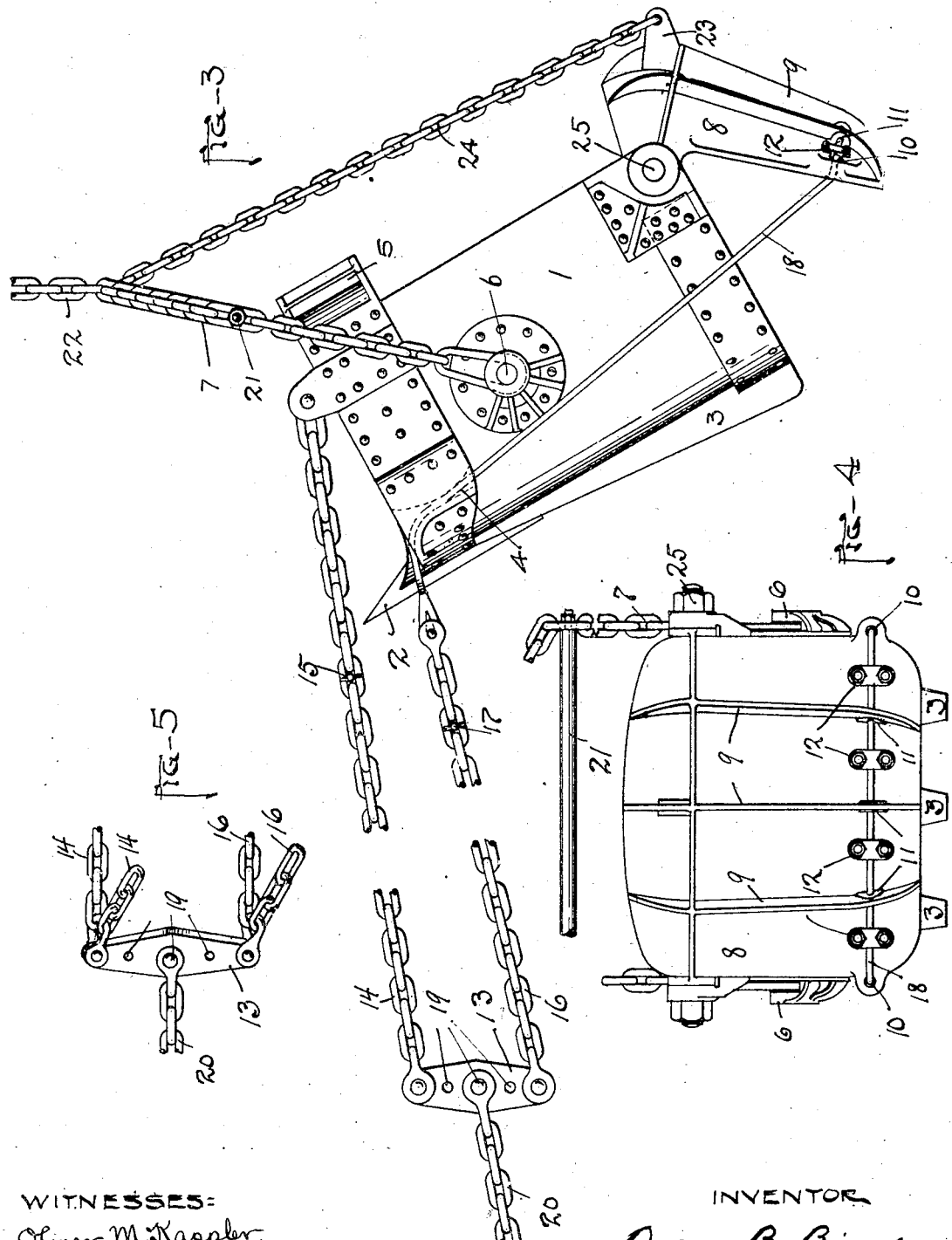

UNITED STATES PATENT OFFICE.

OSCAR B. BJORGE, OF DULUTH, MINNESOTA, ASSIGNOR TO CLYDE IRON WORKS, OF DULUTH, MINNESOTA, A CORPORATION OF MAINE.

DRAG-LINE BUCKET.

1,104,771.  Specification of Letters Patent.  Patented July 28, 1914.

Application filed March 20, 1912. Serial No. 684,984.

*To all whom it may concern:*

Be it known that I, OSCAR B. BJORGE, a citizen of the United States, and a resident of Duluth, county of St. Louis, and State of Minnesota, have invented a new and useful Improvement in Drag-Line Buckets, of which the following is a specification, the principle of the invention being herein explained and the best mode in which I have contemplated applying that principle, so as to distinguish it from other inventions.

The present invention relates to excavator buckets of the type generally known as drag line buckets. A bucket of this type is usually employed in association with mechanism which includes a swinging boom with a hoist line leading from the hoisting engine to the point of the boom and thence to the bucket, and also a drag line leading from the hauling drum of the engine out to the bucket. The present invention provides an improved bucket of this general type, and one that after performing its digging operation by being hauled toward the engine dumps its load from its back end or the end away from the engine. To the accomplishment of these and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings:—Figure 1 is a broken side elevation of a bucket embodying the invention; Fig. 2 is a broken cross section on the line A—A in Fig. 1; Fig. 3 is a view similar to that of Fig. 1, with the parts in a different operative position, and embodying a modifying feature; Fig. 4 is a rear elevation of the bucket, and Fig. 5 is a perspective view of a detail.

The invention provides a bucket or shovel member 1 which is open at its ends, and which at the front end of its bottom is provided with a cutting edge and with cutting teeth 2, while on the under side of its bottom are provided a plurality of ribs 3. A guide 4 is provided on each side of the shovel 1 near the front and bottom thereof, and a strut 5 rigidly connects the two sides of the shovel at its front end. The shovel is connected at a point 6 with the hoist line 7, and the point 6 is so disposed that it is forwardly of the center of gravity of the loaded shovel so that when the shovel is lifted from the ground when loaded it will tend to tilt backwardly on its pivotal axis 6. The hoist line, of course, leads to each side of the shovel and the two parts of the line 7 are preferably spaced by a rod 21, the two parts of the line being ultimately connected with a single line 22 which leads over the point of the boom.

A gate or closing member 8 is secured to the back of the shovel so as to be movable relatively thereto, and it is preferably secured to the shovel on a pivotal axis 25 substantially at the top of the rear end of the shovel and adapted to swing outwardly to open the rear end of the shovel. On its rear face the gate is provided with a plurality of ribs 9, and at each side near the bottom it is formed with a hole 10, the ribs being provided with holes 11, and a plurality of guides 12 are also provided on the rear face of the gate.

In front of the bucket is a link or member 13, to the upper end of which are secured lines 14 suitably spaced by a rod 15 and connected to the front of the bucket near the top at each side. Similar lines 16 are secured to the lower end of the link 13 and are spaced by a rod 17. A continuous cable 18 is connected with the ends of the lines 16 and passes backwardly through the guides 4, the holes 10, and across through the holes 11 and the guides 12, but if preferred the lines 16 may be continuous and the cable 18 then dispensed with. The link 13 is provided between its ends with a plurality of holes 19, to a selected one of which is connected a line 20 leading to the hauling drum.

In operation the bucket or shovel will be lowered to the ground by the hoisting line to a point substantially below the point of the boom and the hauling line will then be pulled in. Since the hauling line, which term comprehends the combination of the several units of the hauling line, is longitudinally slidable relatively to the shovel proper and is connected with the gate below its pivotal axis, tension on the hauling line will retain the gate in closed position, and as the line is hauled in it will drag the shovel by, so to speak, compelling the gate to push the shovel along in front of it. The angle at which the shovel will dig is determined by the selection of the point of attachment of line 20 to link 13; in this way the tension is transmitted chiefly to the cables 14 or 16, as the case may be, and the shovel will assume a corresponding angular position, so that by such selection the shovel may be made to dig properly to a greater or less depth. After the shovel has been filled with material it is elevated by the hoisting line and the tension on the hauling line is maintained so that the gate is retained in its closed position and the shovel maintained in substantially horizontal position until it has been swung by the hoisting line to a position substantially under the point of the boom, and the boom swung toward the desired dumping place. Tension on the hauling line is then released, and because of the relation of its point of pivotal support to its center of gravity when loaded, the shovel then tilts backwardly into the position shown in Fig. 3 and the gate swings open by reason of its own weight aided by the weight of the load pressing upon it.

It is sometimes desirable to provide, in addition to the force of gravity, some means for positively pulling the gate from its closing position. To this end the gate may be conveniently provided with lug 23, to which is connected line 24 which is also connected with the hoisting line. The line 24 will be made of such length that when the shovel tilts backwardly, it will pull upwardly on the lug and hence positively pull the gate into open position.

After the shovel has dumped its load, the hauling line is again put under tension and at the same time the hoisting line is paid out so that the gate is again closed and the shovel lowered to the ground below the point of the boom, when it is again ready to repeat its cycle of operation.

It will be understood that the lines for hauling and hoisting the shovel, and for positively opening the shovel door, may be formed of cable, chain or any other suitable material, and it is intended that throughout the specification and claims the use of any one of these terms comprehends all of them.

Other modes of applying the principle of my invention may be employed instead of the one explained, change being made as regards the mechanism herein disclosed, provided the means stated by any of the following claims or the equivalent of such stated means be employed. I therefore particularly point out and distinctly claim as my invention:—

1. In mechanism of the character described, the combination of supporting means; a shovel pivoted thereto forward of its center of gravity when loaded; a gate movably attached to the shovel and arranged to close and bear against the rear end thereof; and forwardly hauling means attached to the gate and slidable relatively to the shovel and arranged, when under tension, to close the gate and thereby pull the shovel forwardly.

2. In mechanism of the character described, the combination of supporting means; a shovel pivoted thereto forward of its center of gravity when loaded; a gate pivoted to the rear end of the shovel and arranged to close and bear against such end; and forwardly hauling means attached to the gate below its pivotal axis and slidable relatively to the shovel.

3. In mechanism of the character described, the combination of supporting means; a shovel pivoted thereto forward of its center of gravity when loaded; a gate pivoted to the shovel at substantially the top of the rear end thereof and arranged to close and bear against such end; and forwardly hauling means attached to the gate below its pivotal axis and slidable relatively to the shovel.

4. In mechanism of the character described, the combination of supporting means; a shovel pivoted thereto forward of its center of gravity when loaded; a gate pivoted to the rear end of the shovel and arranged to close and bear against such end; forwardly hauling means attached to the gate below its pivotal axis and slidable relatively to the shovel; and a cable attached to the supporting means and to the gate rearward of its pivotal axis and limiting downward movement of the gate at its point of attachment thereto.

5. In mechanism of the character described, the combination of supporting means; a shovel attached thereto forward of its center of gravity when loaded, the shovel being provided near the front of its sides with guides; a gate pivoted to the shovel at substantially the top of the rear end thereof and arranged to close and bear against such end; and a forwardly hauling cable extending across and attached to the gate below its pivotal axis and extending slidably through said guides.

6. In mechanism of the character described, the combination of supporting means; a shovel attached thereto forward of its center of gravity when loaded, the shovel being provided near the front of its sides with guides; a gate pivoted to the shovel at substantially the top of the rear end thereof and arranged to close and bear against such end; a forwardly hauling cable extending across and attached to the gate below its pivotal axis and extending slidably through said guides; and a cable attached to the supporting means and to the gate rearward of its pivotal axis and limiting downward movement of the gate at its point of attachment thereto.

Signed by me this 12th day of March, 1912.

OSCAR B. BJORGE.

Attested by—
H. C. BECKWITH,
JOHN R. MCGIFFERT.